(12) United States Patent
Kotab

(10) Patent No.: US 10,075,768 B1
(45) Date of Patent: *Sep. 11, 2018

(54) SYSTEMS AND METHODS FOR CREATING AND STORING REDUCED QUALITY VIDEO DATA

(71) Applicant: Dominic M. Kotab, San Jose, CA (US)

(72) Inventor: Dominic M. Kotab, San Jose, CA (US)

(73) Assignee: Dominic M. Kotab, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,239

(22) Filed: Feb. 12, 2015

Related U.S. Application Data

(63) Continuation of application No. 12/362,966, filed on Jan. 30, 2009, now Pat. No. 8,965,183.

(60) Provisional application No. 61/024,851, filed on Jan. 30, 2008.

(51) Int. Cl.
*H04N 21/462* (2011.01)
*H04N 5/765* (2006.01)
*H04N 21/433* (2011.01)
*H04N 21/4402* (2011.01)

(52) U.S. Cl.
CPC ......... *H04N 21/4621* (2013.01); *H04N 5/765* (2013.01); *H04N 21/4334* (2013.01); *H04N 21/440281* (2013.01)

(58) Field of Classification Search
CPC ............... H04N 21/4621; H04N 5/765; H04N 21/4334; H04N 21/440281
See application file for complete search history.

(56) References Cited

U.S. PATENT DOCUMENTS

| 4,963,995 | A | | 10/1990 | Lang |
| 5,164,839 | A | | 11/1992 | Lang |
| 5,438,423 | A | | 8/1995 | Lynch et al. |
| 5,558,339 | A | * | 9/1996 | Perlman ................. A63F 13/12 463/23 |
| 6,020,912 | A | | 2/2000 | De Lang |
| 6,061,056 | A | | 5/2000 | Menard et al. |

(Continued)

OTHER PUBLICATIONS

Notice of Allowance from U.S. Appl. No. 12/491,954, dated Aug. 28, 2015.

(Continued)

*Primary Examiner* — Hung Dang
*Assistant Examiner* — Sunghyoun Park
(74) *Attorney, Agent, or Firm* — Zilka-Kotab, P.C.

(57) ABSTRACT

A method for storing video data according to one embodiment includes receiving a video signal comprising television programming, and converting the video signal to video data. Additionally, the method includes storing first temporal-based portions of the video data in files on a first storage device, storing second temporal-based portions of the video data in files on a second storage device, and creating reduced quality video data from the video data based on the first and/or second temporal-based portions of the video data. Further, the method includes outputting the first temporal-based portions of the video data and/or the second temporal-based portions of the video data, outputting the reduced quality video data to a first device via a network, and outputting the first temporal-based portions of the video data and/or the second temporal-based portions of the video data to a second device via the network.

20 Claims, 6 Drawing Sheets

(56) References Cited

U.S. PATENT DOCUMENTS

| | | | |
|---|---|---|---|
| 6,920,281 B1* | 7/2005 | Agnibotri | G11B 27/034 348/E5.108 |
| 7,068,316 B1* | 6/2006 | Pine | H04N 3/155 348/294 |
| 7,167,639 B2 | 1/2007 | Haddad et al. | |
| 7,191,462 B1 | 3/2007 | Roman et al. | |
| 7,814,555 B2 | 10/2010 | Iwamoto et al. | |
| 8,965,183 B1 | 2/2015 | Kotab | |
| 9,232,174 B1 | 1/2016 | Kotab | |
| 9,621,951 B2 | 4/2017 | Kotab | |
| 2001/0013129 A1* | 8/2001 | Asai | H04L 29/06 725/91 |
| 2002/0001348 A1* | 1/2002 | Yiwen | H04N 5/4401 375/240.26 |
| 2002/0046404 A1 | 4/2002 | Mizutani | |
| 2002/0047921 A1* | 4/2002 | Folio | H04N 7/025 348/473 |
| 2002/0075876 A1* | 6/2002 | Yoshikawa | H04H 20/02 370/395.42 |
| 2002/0118296 A1* | 8/2002 | Schwab | C12Q 1/6883 348/441 |
| 2002/0131651 A1* | 9/2002 | Anantharamu | G06T 3/40 382/284 |
| 2003/0018796 A1* | 1/2003 | Chou | H04L 29/06 709/231 |
| 2003/0041334 A1* | 2/2003 | Lu | H04L 29/06027 725/113 |
| 2003/0161401 A1* | 8/2003 | Shen | G06T 3/4084 375/240.16 |
| 2003/0185542 A1* | 10/2003 | McVeigh | G11B 27/034 386/232 |
| 2004/0071211 A1* | 4/2004 | Washino | H04N 21/440281 375/240.01 |
| 2004/0184531 A1* | 9/2004 | Lim | G11B 31/006 375/240.01 |
| 2004/0237104 A1 | 11/2004 | Cooper et al. | |
| 2005/0132414 A1* | 6/2005 | Bentley | G08B 13/19606 725/105 |
| 2005/0195899 A1* | 9/2005 | Han | H04N 21/234327 375/240.21 |
| 2005/0210519 A1* | 9/2005 | Ito | H04N 5/76 725/89 |
| 2005/0275758 A1* | 12/2005 | McEvilly | H04N 7/17318 348/725 |
| 2006/0018378 A1* | 1/2006 | Piccinelli | H04N 19/172 375/240.03 |
| 2006/0020710 A1* | 1/2006 | Rabenold | H04N 21/23439 709/236 |
| 2006/0171563 A1* | 8/2006 | Takashima | G01C 21/28 382/104 |
| 2006/0210074 A1* | 9/2006 | Ryu | G11B 20/0021 380/54 |
| 2006/0233515 A1 | 10/2006 | Hino et al. | |
| 2007/0008326 A1* | 1/2007 | Levien | G06T 1/00 345/501 |
| 2007/0058923 A1 | 3/2007 | Buhler | |
| 2007/0110389 A1 | 5/2007 | Hayashi et al. | |
| 2007/0111717 A1 | 5/2007 | Mueller et al. | |
| 2007/0269184 A1* | 11/2007 | Mizuno | G11B 27/034 386/230 |
| 2007/0274675 A1 | 11/2007 | Park | |
| 2008/0008454 A1* | 1/2008 | Umesako | G11B 27/034 386/336 |
| 2008/0072263 A1* | 3/2008 | Kim | H04H 20/57 725/62 |
| 2008/0089362 A1 | 4/2008 | Ezra et al. | |
| 2008/0118223 A1 | 5/2008 | Kamiwada et al. | |
| 2008/0148313 A1* | 6/2008 | Ozawa | H04N 5/44543 725/39 |
| 2008/0162713 A1* | 7/2008 | Bowra | H04N 21/4344 709/231 |
| 2008/0178232 A1 | 7/2008 | Velusamy | |
| 2009/0044128 A1 | 2/2009 | Baumgarten et al. | |
| 2009/0060324 A1* | 3/2009 | Ballerini | H04N 1/648 382/166 |
| 2009/0070407 A1 | 3/2009 | Castle et al. | |
| 2009/0080870 A1* | 3/2009 | Mudie | H04N 5/76 386/232 |
| 2009/0298485 A1 | 12/2009 | Lee et al. | |
| 2011/0087549 A1 | 4/2011 | Ho | |
| 2012/0057848 A1 | 3/2012 | Casagrande | |
| 2012/0201507 A1 | 8/2012 | Kunii et al. | |
| 2016/0100218 A1 | 4/2016 | Kotab | |

OTHER PUBLICATIONS

Corrected Notice of Allowance from U.S. Appl. No. 12/491,954, dated Sep. 15, 2015.
Kotab, D., U.S. Appl. No. 14/970,452, filed Dec. 15, 2015.
Non-Final Office Action from U.S. Appl. No. 12/362,966, dated Nov. 10, 2011.
Final Office Action from U.S. Appl. No. 12/362,966, dated Oct. 10, 2012.
Non-Final Office Action from U.S. Appl. No. 12/362,966, dated Jun. 5, 2013.
Final Office Action from U.S. Appl. No. 12/362,966, dated Jan. 6, 2014.
Notice of Allowance from U.S. Appl. No. 12/362,966, dated Sep. 22, 2014.
Corrected Notice of Allowability from U.S. Appl. No. 12/362,966, dated Nov. 20, 2014.
Non-Final Office Action from U.S. Appl. No. 12/491,954, dated Nov. 16, 2011.
Final Office Action from U.S. Appl. No. 12/491,954, dated Jul. 24, 2012.
Non-Final Office Action from U.S. Appl. No. 12/491,954, dated Jun. 21, 2013.
Final Office Action from U.S. Appl. No. 12/491,954, dated Jan. 9, 2014.
Non-Final Office Action from U.S. Appl. No. 12/491,954, dated Oct. 15, 2014.
Kotab, D., U.S. Appl. No. 12/362,966, filed Jan. 30, 2009.
Kotab, D., U.S. Appl. No. 12/491,954, filed Jun. 25, 2009.
Final Office Action from U.S. Appl. No. 12/491,954, dated Apr. 16, 2015.
Non-Final Office Action from U.S. Appl. No. 14/970,452, dated Apr. 8, 2016.
Final Office Action from U.S. Appl. No. 14/970,452, dated Sep. 9, 2016.
Notice of Allowance from U.S. Appl. No. 14/970,452, dated Dec. 5, 2016.

\* cited by examiner

SYSTEMS AND METHODS FOR CREATING AND STORING REDUCED QUALITY VIDEO DATA

RELATED APPLICATIONS

The present application claims priority to and is a continuation of U.S. patent application Ser. No. 12/362,966, filed Jan. 30, 2009, which claims benefit of U.S. Provisional Patent Application No. 61/024,851 filed Jan. 30, 2008, each of which is incorporated by reference.

FIELD OF THE INVENTION

The present invention relates to managing video data, and more particularly to systems and methods for storing video data.

SUMMARY

A system and method for storing video data according to one embodiment includes receiving a video signal comprising television programming, and converting the video signal to video data. Additionally, the method includes storing first temporal-based portions of the video data in files on a first storage device, storing second temporal-based portions of the video data in files on a second storage device, and creating reduced quality video data from the video data based on at least one of the first temporal-based portions of the video data and the second temporal-based portions of the video data. Further, the method includes outputting at least one of the first temporal-based portions of the video data and the second temporal-based portions of the video data, and outputting the reduced quality video data to a first device via a network, and for outputting the at least one of the first temporal-based portions of the video data and the second temporal-based portions of the video data to a second device via the network.

BRIEF DESCRIPTION OF THE DRAWINGS

For a fuller understanding of the nature and advantages of the present invention, as well as illustrative modes of use, reference should be made to the following detailed description read in conjunction with the accompanying drawings.

Various embodiments of the present invention are described in further detail below with reference to the figures, in which like items are numbered the same in the several figures.

DETAILED DESCRIPTION

The following paragraphs describe certain features and combinations of features that can be used in connection with each of the methods, systems and apparatus of the invention, as generally described above. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation and scope including one or more meanings implied from the specification as well as one or more meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
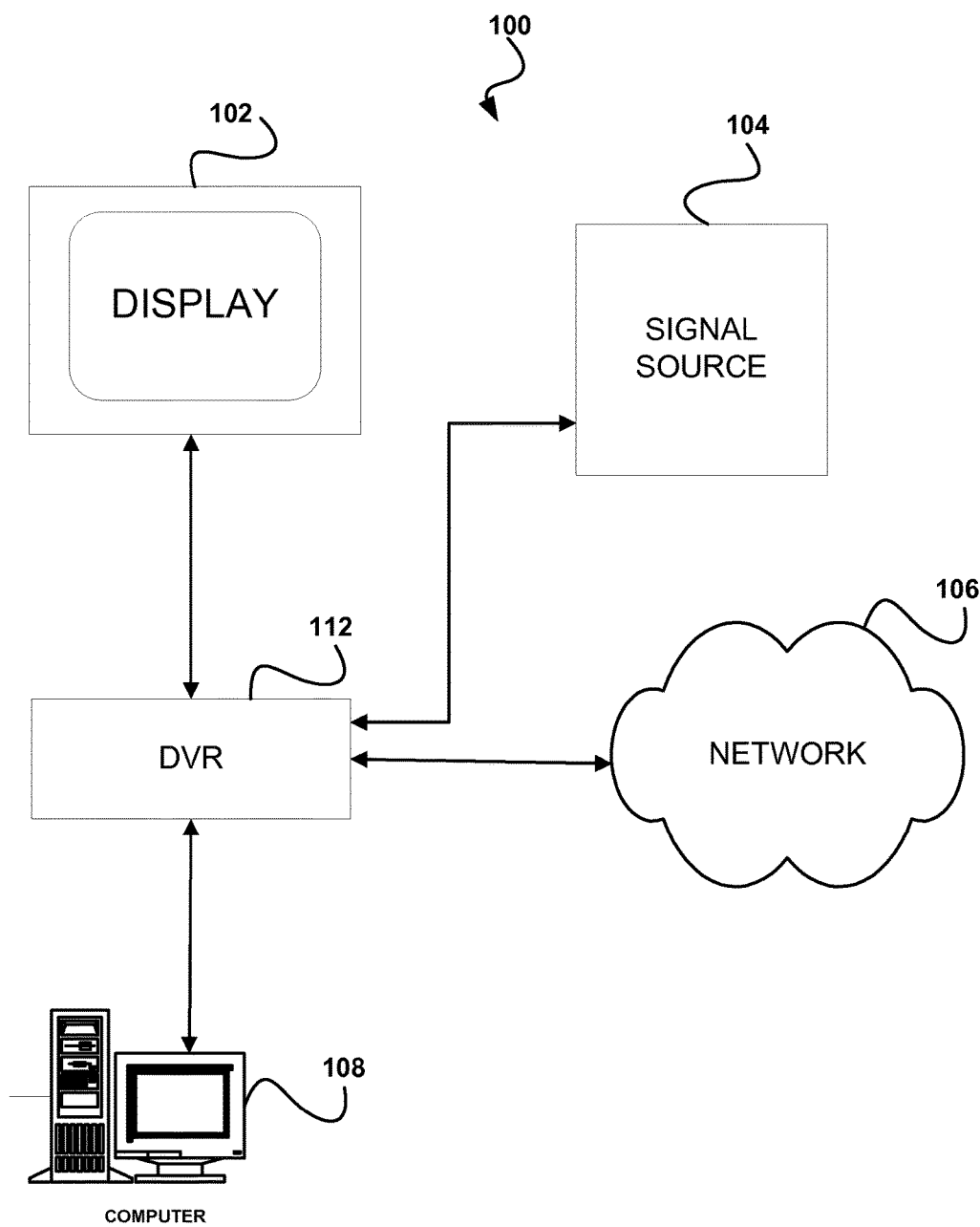
FIG. 1 illustrates a system and environment, in accordance with one illustrative embodiment.

FIG. 1 illustrates an environment 100 in which an embodiment of the present invention may be integrated and/or employed. Thus, in various implementations, systems implementing various aspects of the following features may include some or all of the components of FIG. 1. As shown, a recorder 112 such as a Digital Video Recorder (DVR), computer system, tape-based recording system, etc. may placed be in communication with a network 106. In the context of the present system and environment 100, the network 106 may take any form including, but not limited to, a local area network (LAN), a wireless network, a wide area network (WAN) such as the Internet, peer-to-peer network, cable television network, a telephonic network, etc. and combinations thereof. Additionally, the recorder 112 may be any type of device that is capable of receiving and recording video data.

Furthermore, the recorder 112 is placeable in communication with a display 102. The display may be a television monitor, a computer monitor, a video projector, or any type of display. Such connection may be a direct connection, connection via network, connection via an additional device or devices, etc. and combinations thereof. In addition, the recorder 112 is placeable in communication with a signal source 104, e.g., via a communication port such as an HDMI port, a coaxial cable port, an RCA jack, a network adapter, etc. The signal source 104 may include any entity or device capable of providing a video signal to the recorder 112. For example, the signal source 104 may be an antenna receiving a signal from a television tower, a satellite signal, a satellite signal receiver, a satellite antenna, a video camera, a cable company's transmitter, a cable box, etc.

In some embodiments, the recorder 112 may be placed in communication with a computer 108. The computer 108 may include a desktop computer, lap-top computer, hand-held computer, mobile phone, personal digital assistant (PDA), peripheral (e.g. printer, etc.), any component of a computer, and/or any other type of logic.

Figure 2:
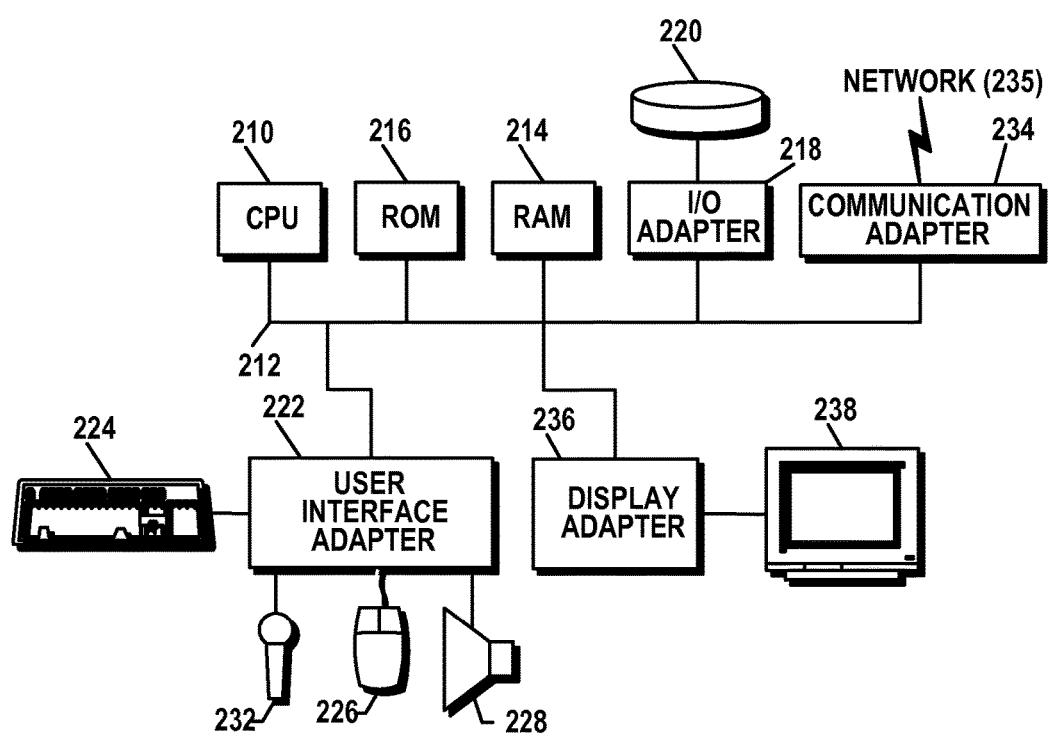
FIG. 2 shows a representative hardware environment, in accordance with one illustrative embodiment.

FIG. 2 shows a representative hardware environment that may be associated with the recorder 112 and/or the computer 108 of FIG. 1, in various embodiments. FIG. 2 illustrates a typical hardware configuration of a system in accordance with one embodiment having a central processing unit 210, such as a microprocessor, and a number of other components interconnected via a system bus 212.

The system shown in FIG. 2 may include one or more of: a Random Access Memory (RAM) 214, a Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the system to a communication network 235

(e.g., a data processing network) and a display adapter 236 for connecting the bus 212 to a display device 238. Additional or other components may be present in various embodiments.

A method for storing video data according to one embodiment includes receiving a video signal comprising television programming, and converting the video signal to video data. Additionally, the method includes storing temporal-based portions of the video data in files on a storage device such as a hard disk drive, magnetic tape, flash memory, etc. and combinations thereof, and creating reduced quality video data from at least one of the video signal and the video data. Further, the method includes storing the reduced quality video data on a storage subsystem, and outputting at least one of the video data or the reduced quality video data.

In one embodiment, a system for storing video data includes a mechanism for receiving a video signal comprising television programming, and a mechanism for converting the video signal to video data. Additionally, the system includes a mechanism for storing temporal-based portions of the video data in files on a storage device, and a mechanism for creating reduced quality video data from at least one of the video signal and the video data. Further, the system includes a mechanism for storing the reduced quality video data on a storage subsystem, and a mechanism for outputting at least one of the video data and the reduced quality video data. Such mechanisms may include hardware components (e.g., logic, ASICs, subsystems, etc.), software components executed by a processor, remote components or processing, etc. in any combination.

In another embodiment, a system for storing video data includes a mechanism for receiving a video signal comprising television programming and a mechanism for converting the video signal to video data. Additionally, the system includes a mechanism for storing temporal-based portions of the video data in files on a storage device, and a mechanism for storing at least one of a channel, a time, and a program title associated with the temporal-based portions of the video data. Further, the system includes a mechanism for outputting at least one of the video data and the reduced quality video data. In this embodiment, the temporal-based portions of the video data may be unreduced and uncompressed, but may be stored at specific intervals or in accordance with certain events. For example, whenever a channel is changed thereby displaying a different video data on a display, the system may store a portion of the video data in a file on the storage device along with the current channel from which the video data is derived and/or the current time and/or the title of the program on the current channel according to programming information, such as a guide. In this way, very specific information may be generated that describes the full extent of what was viewed over a period of time. For example, if a viewer turns on a display at 6:00 PM and watches Miami Vice on channel 6 for one hour, then switches to channel 8 to watch Who's The Boss for 20 minutes, the system may store a portion of the video data such as a single frame, e.g., from the title scene of Miami Vice in a file on the storage device along with other information including the current channel (channel 6), the program's title (Miami Vice), a description of the program e.g., from a program guide, and/or 6:00 PM as a time stamp. When the viewer switches to channel 8 to watch Who's The Boss, the system may store a portion of the video data such as a single frame from the title scene of Who's The Boss in a file on the storage device along with information including the current channel (channel 8), the program's title (Who's The Boss), a description of the program e.g., from a program guide, and/or 7:00 PM as a time stamp. In this embodiment, less video data is stored over time, but even more information is available to determine which shows were watched and at what time.

Figure 3:
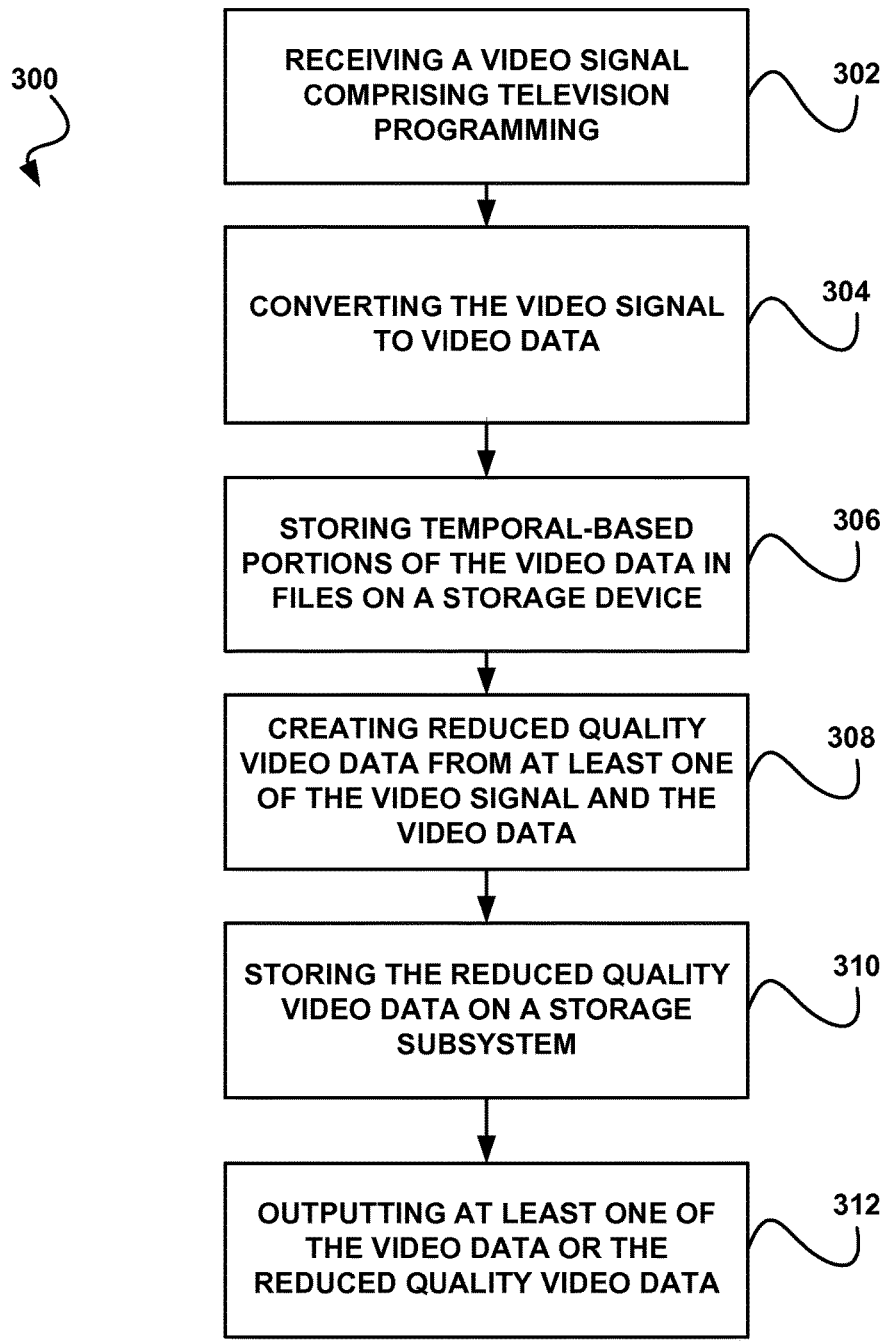
FIG. 3 shows a general method for storing video data, in accordance with one illustrative embodiment.

FIG. 3 shows a general method 300 for storing video data according to one illustrative embodiment. As an option, the method 300 may be implemented in the context of the architecture and environment of FIGS. 1 and/or 2. Of course, however, the method 300 may be carried out in any desired environment.

As shown in operation 302, a video signal comprising television programming is received. The video signal may be at least one of a digital video signal and an analog video signal. Additionally, the video signal may be a publicly available television signal, a terrestrial signal, a cable signal, a satellite signal, or any other type of video signal. Further, the television programming may be any type of programming related to television. For example, the television programming may be subscription programming, pay-per-view (PPV) programming, public broadcast programming, etc. and combinations thereof. In one embodiment, the video signal may comprise multiple television channels. In another embodiment, the aforementioned method may also include changing from one television channel to another television channel, e.g., upon receiving an instruction to change the channel; based on a time and channel recording setting, a season pass to a particular program, etc. and combinations thereof. To facilitate user-specification of channel changing and/or selection of programming to record, a guide may be output. Such guide may include one or more of a listing of television channels; a listing of programming by name, type, actor, etc. and combinations thereof; a description of particular programs; etc. and combinations thereof.

In some embodiments, the recorder may receive the signal from a remote source or from a local receiver. For example, in one embodiment, a cable box may receive a digital or analog television signal through a coaxial cable. In another embodiment, a satellite dish may receive a digital or analog television signal from a satellite transmitter. In still another embodiment, an antenna may receive an analog or digital terrestrial television signal from a transmitter. However, the video signal may be received in any manner.

Additionally, the video signal is converted to video data, as shown in operation 304. The video data may be any data capable of being viewed as video. For example, the video data may be National Television System Committee (NTSC) formatted data, Motion Picture Editors Guild (MPEG) video data, QuickTime (.mov) data, etc. For example, the converting may include decrypting an encrypted transmission, assembling fragments of data sent via the video signal, compressing the video signal, etc. In one embodiment, the video data may be stored in a proprietary format.

Furthermore, as shown in operation 306, temporal-based portions of the video data are stored in files on a storage device. In one embodiment, the temporal-based portions may be determined utilizing information from the television programming. For example, thirty minutes of the video data may be stored in a file on the storage device if it is determined from the television programming that the length of the show being recorded is thirty minutes. In another example, temporal chunks of time, e.g., of 5, 10, 30, 60, etc., minutes may be stored. Of course, however, the temporal-based portions may be determined in any manner.

In addition, the storage device may be any device capable of storing files. As an option, the storage device may include the RAM 214, ROM 216, and disk storage units 220 of FIG. 2. As an alternative, the storage device may be a standalone storage unit such as a USB portable hard drive. Further, the storage device may be remote from the system and accessible via a network. In one embodiment, the video signal may be continuously received, converted, and stored.

Additionally, in operation 308 reduced quality video data is created from at least one of the video signal and the video data. The reducing may be performed in any manner. For example, periodic snapshots may be extracted from the video signal, e.g., an image representative of the signal may be extracted at specified times and/or randomly and stored. In another example, the framerate of the video data may be lowered. For example, if the video data is received at 60 frames per second (fps), it may be reduced to 10 fps, 5 fps, 1 fps, 1 frame per minute (fpm), 0.1 fpm, 0.01 fpm, etc., in order to reduce the memory required to store the captured video.

In still another example, the video data may be compressed. In one embodiment, the compressing may occur at any ratio. For example, the compressing may occur at a ratio of about 1.1:1 to about 40,000:1. Particular examples include about 2:1, about 50:1, about 96:1, about 1,000:1, about 5,000:1, etc. Of course, more or less compression may be used. In another embodiment, the quality of the reduced quality video data may be set by a user, according to an available space in memory on a storage device, etc. The amount of compression may refer to any quantifiable aspect of the video data and compressed video data, including number of bits, bit rate, relative number of pixels in a frame, relative frame rates, etc. and combinations thereof.

In one embodiment, in operation 308, the reduced quality video data that is created from at least one of the video signal and the video data may be captured periodically, such as every 10 seconds, every 30 seconds, every 1 minute, every 5 minutes, every 30 minutes, etc. In addition, the capturing may occur in response to certain events, such as changing a channel, turning on a display, changing to one of a specific list of channels, etc.

In yet another embodiment, the resolution of the video data may be reduced. According to one embodiment, the reduced quality video may utilize at least 50% less memory than the video data. Preferably, the reduced quality video may utilize at least 90% less memory than the video data, and even more preferably at least 95% less memory than the video data.

In a further approach, the screen size of the reduced quality video data may be at least 75% lower than the screen size of the video data, as measured by pixel size. For example, if the screen size of the video data is 42", then the screen size of the reduced quality video data may be about 10" or less. Of course, the reduced quality video data may still be scaled up to display on the full screen size of the display monitor, or any size as chosen by the system and/or the user. Preferably, the screen size of the reduced quality video data may be at least 90% lower than the screen size of the video data, and even more preferably the reduced quality video data may be at least 95% less than the screen size of the video data.

In yet another embodiment, the video data quality may be continuously reduced as it is received and/or converted, e.g., as where the video signal may be continuously received, converted, and stored. In still another embodiment, the video data quality may be reduced after being stored. Preferably, the reduced quality video data may utilize less memory than the video data. For example, the reduced quality video data may utilize at least 1% less memory, at least 25% less memory, at least 75% less memory, at least 90% less memory, etc., relative to the amount of memory used to store the video data.

In another embodiment, the screen size or resolution of the reduced quality video data may be lower than the screen size or resolution of the video data. For example, the screen size or resolution of the reduced quality video data may be at least 1% lower, at least 50% lower, at least 75% lower, at least 90% lower, etc. Reducing the screen size may result in a reduced resolution of the video data, but need not be so limited.

As shown in operation 310, the reduced quality video data is stored on a storage subsystem. The storage subsystem may be any storage medium capable of storing video data. For example, the storage subsystem may comprise a portion of the storage device, a wireless device, a networked device, a flash memory device, a Compact Disc-Recordable (CD-R), a video cassette recorder (VCR), etc. Additionally, the reduced quality video data may be stored on a separate device from where the video data is stored.

In one embodiment, the reduced quality video data may be stored as long as room is available on the storage subsystem. In another embodiment, a portion of the reduced quality video data may be deleted, sent to another storage medium, or both if it is determined that the storage subsystem is full. For example, if it is determined that the storage subsystem is full, oldest portions of the reduced quality video data may be copied to a network-accessible hard drive and/or deleted from its current location.

In yet another embodiment, creating and/or storing the reduced quality video data may be suspended upon receiving a disabling command. For example, the user may suspend creating and/or storing the reduced quality video data on a show-by-show basis. In another example, the user may suspend creating and/or storing the reduced quality video data on a temporal basis. In yet another example, the user may suspend creating and/or storing the reduced quality video data until a channel is changed.

Furthermore, the disabling command may be set by the user. Further, the amount of the storage subsystem used for storing the reduced quality video data may be determined by the user. For example, the user may select a certain percentage of the storage device to be used to store the reduced quality video data.

In still another embodiment, a second video signal may be received from at least one of a home security system or video camera. In addition, the second video signal may be converted to second video data. Further, the quality of the second video data may be reduced, and the reduced quality second video data may be stored.

As shown in operation 312, at least one of the video data and the reduced quality video data is output. Outputting the data may include displaying the data on a display such as the display 102 depicted in FIG. 1, sending the data to another device, converting and saving the data to a playable format, etc. For example, at least one of the video data and the reduced quality video data may be output to a flash memory device, portable hard drive, etc.

In another example, at least one of the video data and the reduced quality video data may be converted to a format playable on a computer. In yet another example, at least one of the video data and the reduced quality video data may be uploaded to a computer via a network. In still another example, the outputting logic may function only when coupled to the reducing logic It should be noted that in the situation where the recorder has multiple inputs, the methodology described above and/or elsewhere herein, or portions thereof, may be performed for each input.

Figure 4:
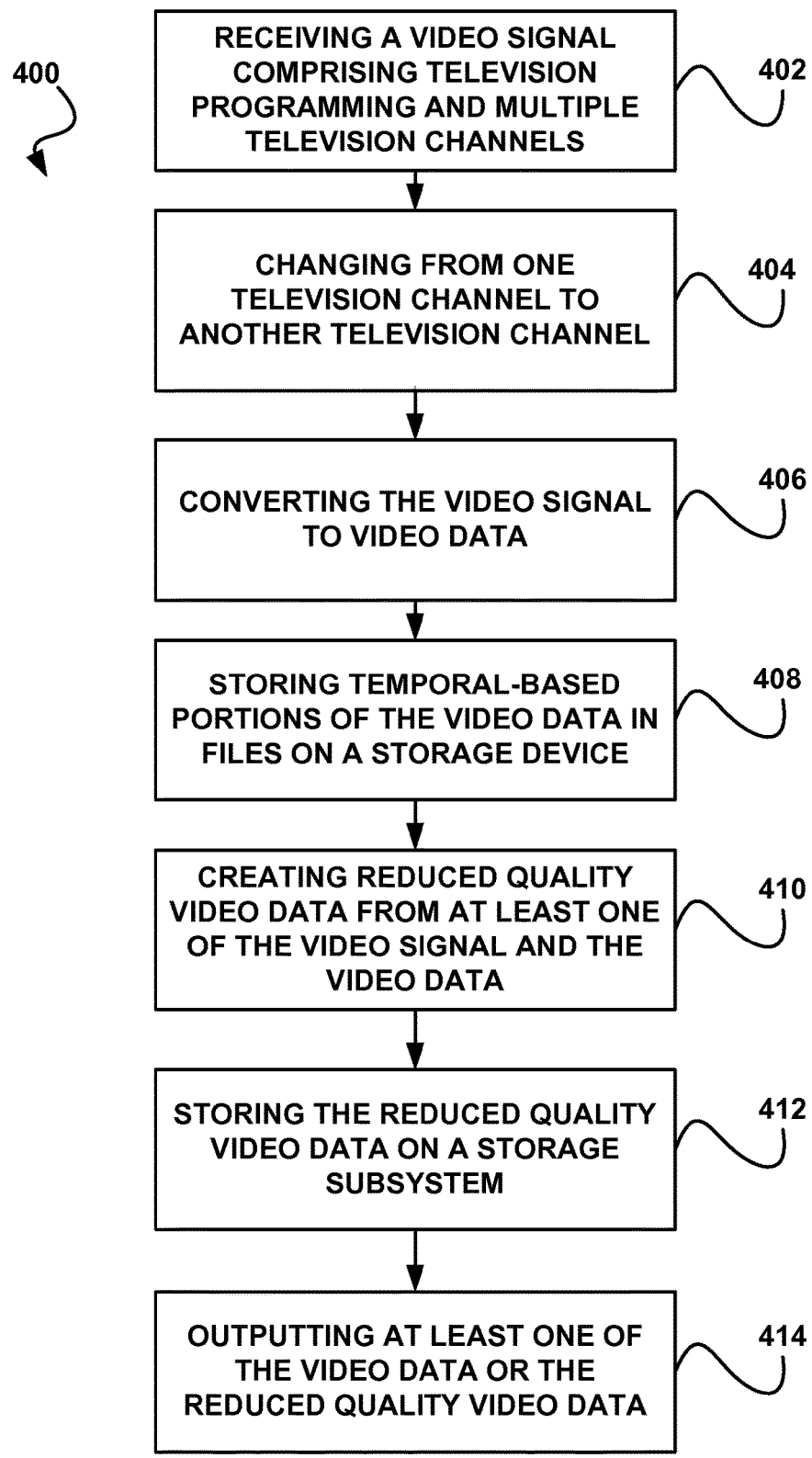
FIG. 4 shows a general method for storing video data, in accordance with another illustrative embodiment.

In accordance with another illustrative example, FIG. 4 shows a general method 400 for storing video data. As an option, the method 400 may be implemented in the context of the architecture and environment of FIGS. 1, 2, and/or 3. Of course, however, the method 400 may be carried out in any desired environment.

As shown in operation 402, a video signal comprising television programming and multiple television channels is received. Additionally, in operation 404 one television channel is changed to another television channel. Further, the video signal is converted to video data. See operation 406. Further still, in operation 408 temporal-based portions of the video data are stored in files on a storage device. Also, in operation 410 reduced quality video data is created from at least one of the video signal and the video data.

Additionally, in operation 412 the reduced quality video data is stored on a storage subsystem. Furthermore, in operation 414 at least one of the video data or the reduced quality video data is output. In addition, the reducing comprises one or more of taking periodic snapshots of the video signal, compressing the video data, and lowering the framerate of the video data. For example, the framerate may be reduced from 60 fps to 10 fps, 5 fps, 1 fps, 0.5 fps, 1 frame per minute (fpm), 0.1 fpm, 0.01 fpm, etc.

Figure 5:
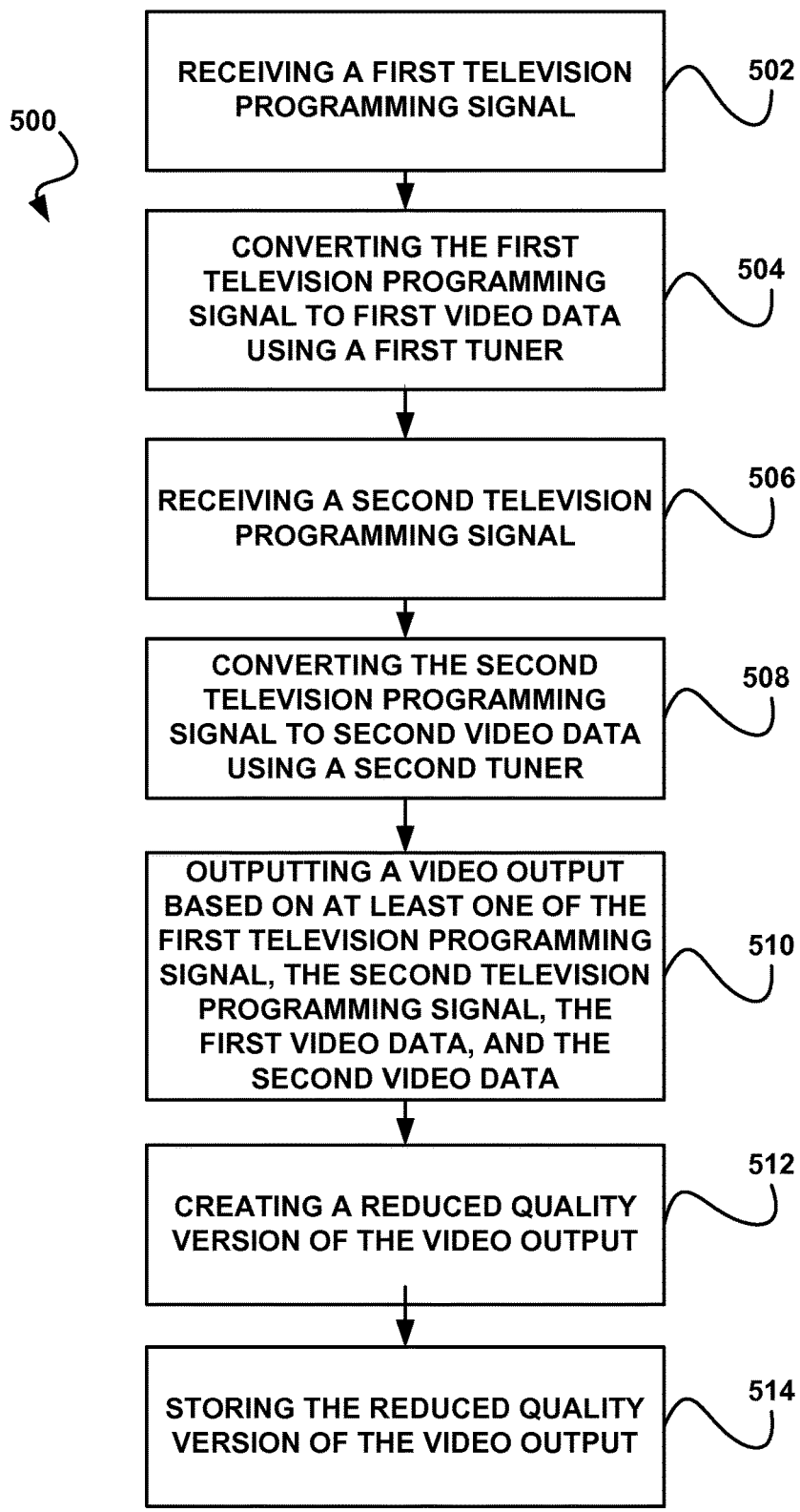
FIG. 5 shows a general method for storing video data, in accordance with yet another illustrative embodiment.

In yet another illustrative example, FIG. 5 shows a general method 500 for storing video data. As an option, the method 500 may be implemented in the context of the architecture and environment of FIGS. 1, 2, and/or 3. Of course, however, the method 500 may be carried out in any desired environment.

As shown in operation 502, a first television programming signal is received. Additionally, in operation 504, the first television programming signal is converted to a first video data using a first tuner. As shown in operation 506, a second television programming signal is received. In operation 508, the second television programming signal is converted to a second video data using a second tuner.

Further, in operation 510 a video output based on at least one of the first television programming signal, the second television programming signal, the first video data, and the second video data is output. Further still, in operation 512 a reduced quality version of the video output is created. As shown in operation 514, the reduced quality version of the video output is stored.

Figure 6:
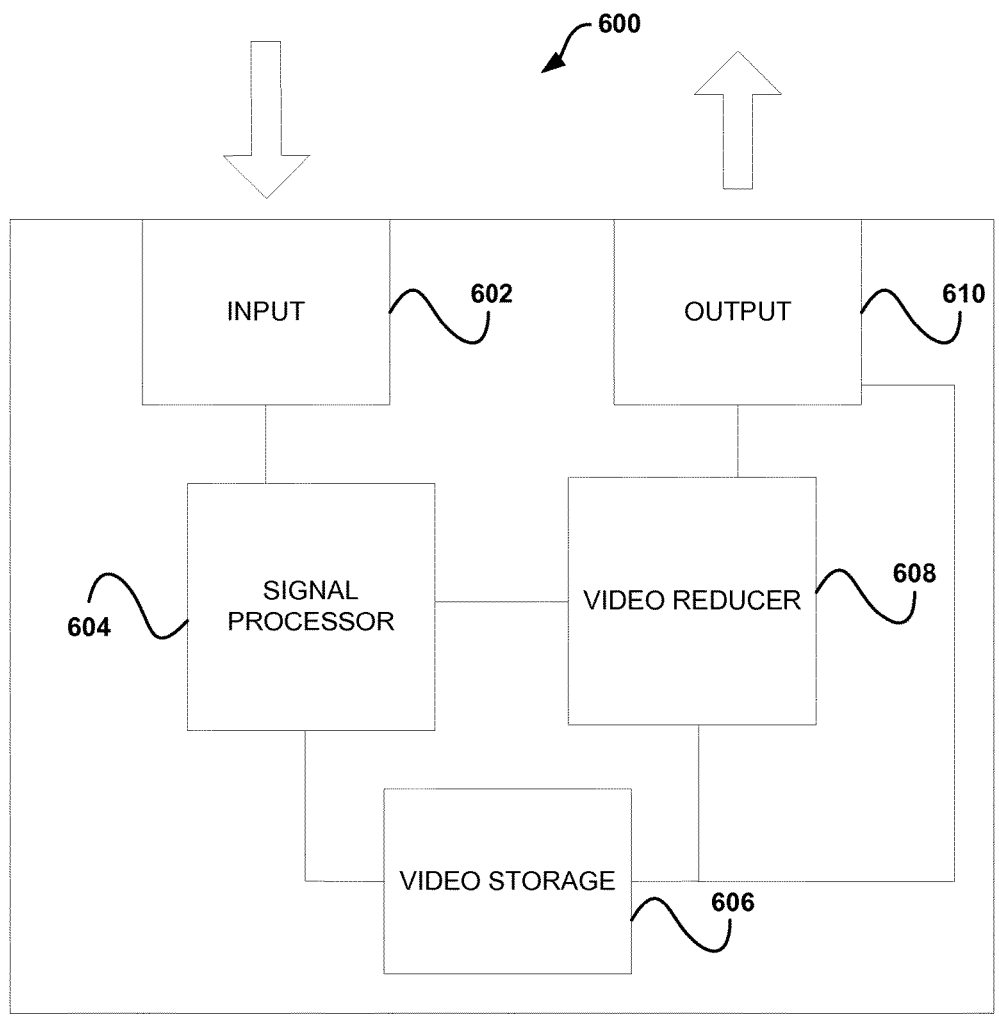
FIG. 6 shows a representative hardware environment, in accordance with another illustrative embodiment.

Additionally, FIG. 6 shows a representative hardware environment 600 that may be associated with the recorder 112 of FIG. 1, in accordance with one embodiment. The system shown in FIG. 6 may include one or more of an input 602, a signal processor 604, video storage 606, a video reducer 608, and an output 610.

As shown, the input 602 is in communication with the signal processor 604. The input 602 may be any input capable of receiving a video signal. For example, the input 602 may include a coaxial cable input, one or more RCA inputs, a registered jack (RJ)45 and/or RJ11 input, etc. Additionally, the signal processor 604 may be any processor capable of receiving a video signal and converting the video signal to video data. For example, the signal processor 604 may include a microprocessor, a digital signal processor (DSP), etc.

Further, the signal processor 604 and the video reducer 608 are in communication with the video storage 606. The video storage 606 may be any module capable of storing video data. For example, the video storage 606 may include a hard drive, a flash drive, a networked drive, etc. In one embodiment, the video storage 606 may include RAM 214 and/or ROM 216 as illustrated in FIG. 2.

Additionally, the video reducer 608 may be any module capable of creating reduced quality video data. For example, the video reducer 608 may include a processor, one or more hardware implementations, etc. In one embodiment, the video reducer 608 and the signal processor 604 may be located in the same module. In another embodiment, the video reducer 608 and the signal processor 604 may be separate modules.

Further still, the video storage 606 and the video reducer 608 are in communication with the output 610. The output 610 may include any module capable of outputting video data. For example, the output 610 may include a High-Definition Multimedia Interface (HDMI) output, a coaxial output, an RCA output, etc.

While the present invention has been illustrated and described with reference to specific embodiments, further modification and improvements will occur to those skilled in the art. The present description has thus been presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown or described, but is to be accorded the widest scope consistent with the principles and features disclosed herein.

In particular, various embodiments discussed herein may be implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention may be executed illustratively incorporates one or more general-purpose computers or special-purpose devices. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

In one illustrative example of use, a commercially-available DVR is capable of performing at lest some of the method steps presented above. In addition, the DVR records up to 30 minutes of live programming (real time recording), so long as the channel is not changed and the DVR is not set to record that program. A young person of age 15 changes the channel to one showing a movie rated R, i.e., that is not suitable for a person of age 15 as determined by the common rating systems that denotes movies and other programming with ratings such as G, PG, PG-13, NC-17, R, X, etc. Upon a parent entering the room, the young person quickly changes the channel, thereby restarting the real time recording.

Additionally, some or all of the aforementioned code may be embodied on any computer readable storage media including tape, flash memory, system memory, hard drive, etc. Additionally, a data signal embodied in a carrier wave (e.g., in a network including the Internet) can be the computer readable storage medium.

While various embodiments have been described above, it should be understood that they have been presented by way of example only, and not limitation. Thus, the breadth and scope of an embodiment should not be limited by any of the above-described exemplary embodiments, but should be defined only in accordance with the following claims and their equivalents.

I claim:

1. A digital video recorder (DVR), comprising:
    hardware and/or code for receiving at the DVR, from a signal source, a video signal comprising television programming;
    a processor for converting, at the DVR, the video signal to video data;
    a first storage device for storing, at the DVR, first temporal-based portions of the video data in files on the first storage device;
    hardware and/or code for sending, by the DVR, second temporal-based portions of the video data to be stored as files on a second storage device separate from the DVR;
    hardware and/or code for creating, at the DVR, reduced quality video data from at least one of the first temporal-based portions of the video data stored in files on the first storage device and the second temporal-based portions of the video data stored in files on the second storage device;
    hardware and/or code for outputting, by the DVR, the reduced quality video data to a first device via a network; and
    hardware and/or code for outputting, by the DVR, at least one of the first temporal-based portions of the video data and the second temporal-based portions of the video data to a second device different from the first device.

2. The DVR of claim 1, wherein the second temporal-based portions of the video data include programmed recordings.

3. The DVR of claim 1, wherein the second storage device is located remotely from the DVR.

4. The DVR of claim 1, wherein the video signal further comprises multiple television channels.

5. The DVR of claim 4, further comprising changing from one television channel to another television channel.

6. The DVR of claim 1, wherein the second device includes a display.

7. The DVR of claim 1, wherein the reduced quality video data is created after the video data is stored.

8. The DVR of claim 1, wherein creating the reduced quality video data comprises at least one of: lowering a framerate of the video data, extracting periodic snapshots from the video signal, compressing the video data, and lowering a resolution of the video data.

9. The DVR of claim 8, wherein the compressing occurs at a ratio of X:1, where X is between 1.5 and 36000.

10. The DVR of claim 1, wherein the reduced quality video data utilizes at least 50% less memory than the video data.

11. The DVR of claim 1, wherein a screen size of the reduced quality video data is at least 75% lower than a screen size of the video data.

12. The DVR of claim 1, wherein the reduced quality video data is stored as long as room is available on the first storage device.

13. The DVR of claim 1, wherein a portion of the reduced quality video data is deleted, sent to another storage medium, or both if it is determined that the first storage device is full.

14. The DVR of claim 1, wherein the reduced quality video data is not stored upon receiving a disabling command.

15. The DVR of claim 1, further comprising a storage subsystem for storing the reduced quality video data, wherein the storage subsystem comprises a portion of the first storage device.

16. The DVR of claim 1, wherein an amount of the first storage device used for storing the reduced quality video data is determined by a user.

17. The DVR of claim 1, wherein a quality of the reduced quality video data is set by a user.

18. The DVR of claim 1, further comprising a mechanism for storing at least one of a channel, a time, and a program title associated with the first and second temporal-based portions of the video data.

19. A method, comprising:
    receiving at a DVR, from a signal source, a video signal comprising television programming;
    converting, at the DVR, the video signal to video data;
    storing, at the DVR, first temporal-based portions of the video data in files on a first storage device;
    sending, by the DVR, second temporal-based portions of the video data to be stored as files on a second storage device separate from the DVR;
    creating, at the DVR, reduced quality video data from at least one of the first temporal-based portions of the video data stored in files on the first storage device and the second temporal-based portions of the video data stored in files on the second storage device;
    outputting, by the DVR, the reduced quality video data to a first device via a network; and
    outputting, by the DVR, at least one of the first temporal-based portions of the video data and the second temporal-based portions of the video data to a second device different from the first device.

20. A computer program product embodied on a non-transitory computer readable medium, comprising:
   code for receiving at a DVR, from a signal source, a video signal comprising television programming;
   code for converting, at the DVR, the video signal to video data;
   code for storing, at the DVR, first temporal-based portions of the video data in files on a first storage device;
   code for sending, by the DVR, second temporal-based portions of the video data to be stored as files on a second storage device separate from the DVR;
   code for creating, at the DVR, reduced quality video data from at least one of the first temporal-based portions of the video data stored in files on the first storage device and the second temporal-based portions of the video data stored in files on the second storage device;
   code for outputting, by the DVR, the reduced quality video data to a first device via a network; and
   code for outputting, by the DVR, at least one of the first temporal-based portions of the video data and the second temporal-based portions of the video data to a second device different from the first device.

* * * * *